United States Patent [19]

Anderson

[11] Patent Number: 4,929,118
[45] Date of Patent: May 29, 1990

[54] SHAFT MOUNTED LOCKING MEANS

[76] Inventor: Ronald L. Anderson, 3641 Agate St., Eugene, Oreg. 97405

[21] Appl. No.: 248,640

[22] Filed: Sep. 26, 1988

[51] Int. Cl.⁵ .............................................. F16B 3/00
[52] U.S. Cl. .................................... 403/356; 403/362; 403/374; 403/366
[58] Field of Search ............... 403/356, 358, 366, 374, 403/362

[56] References Cited

U.S. PATENT DOCUMENTS

| | | | |
|---|---|---|---|
| 1,221,709 | 4/1917 | Dyett | 403/358 |
| 1,611,912 | 12/1926 | Hleb | 403/374 |
| 1,926,798 | 9/1933 | Baumbach | 403/374 |
| 3,140,635 | 7/1964 | Davidson | 403/362 |

Primary Examiner—Andrew V. Kundrat
Assistant Examiner—Carol I. Bordas
Attorney, Agent, or Firm—James D. Givnan, Jr.

[57] ABSTRACT

An elongate lock is positionable along a shaft end segment and acts on a key on the end segment to drive same outwardly into abutment with a shaft carried article. The lock and key have cooperating surfaces which translate lock movement into outward key movement with such surfaces including a rounded key surface such as a woodruff key. A threaded segment of the lock permits forceful lock and key engagement. A modified key is of pin shape.

7 Claims, 1 Drawing Sheet

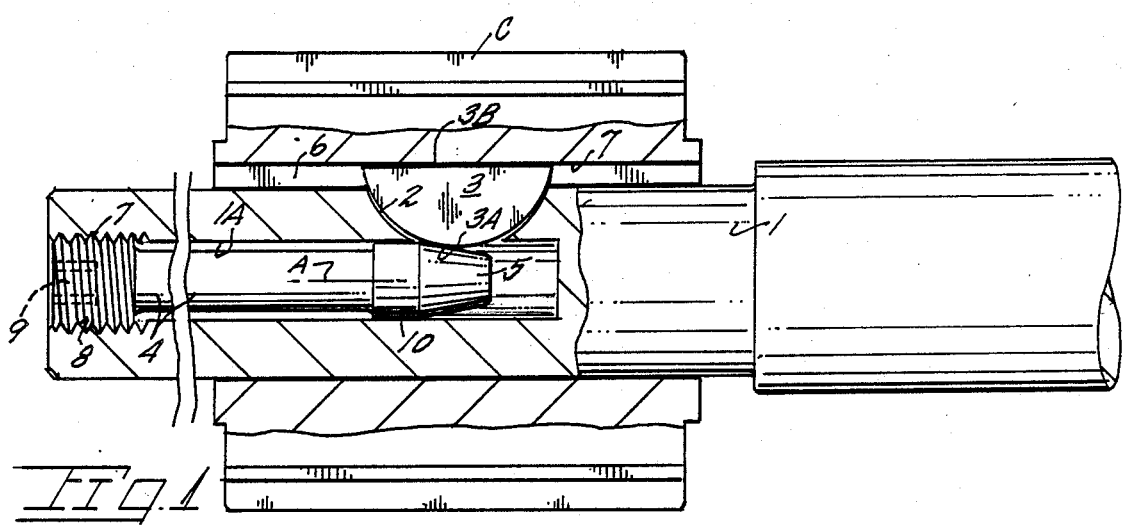
Fig. 1
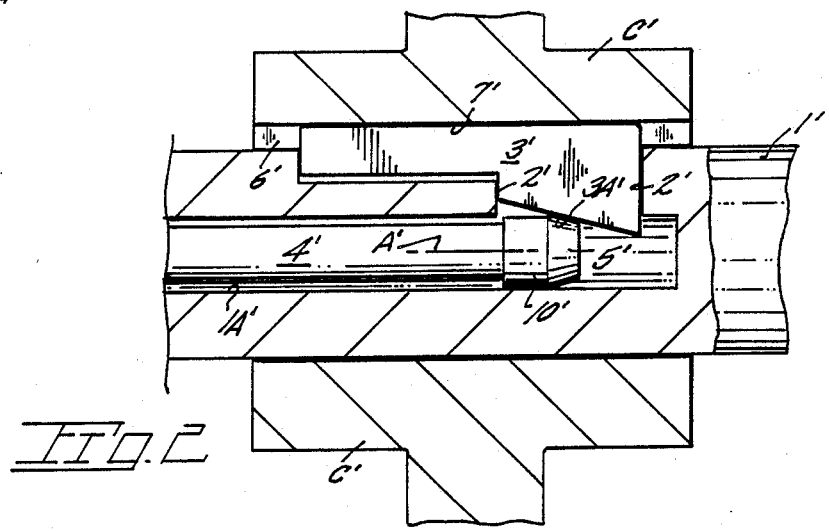
Fig. 2
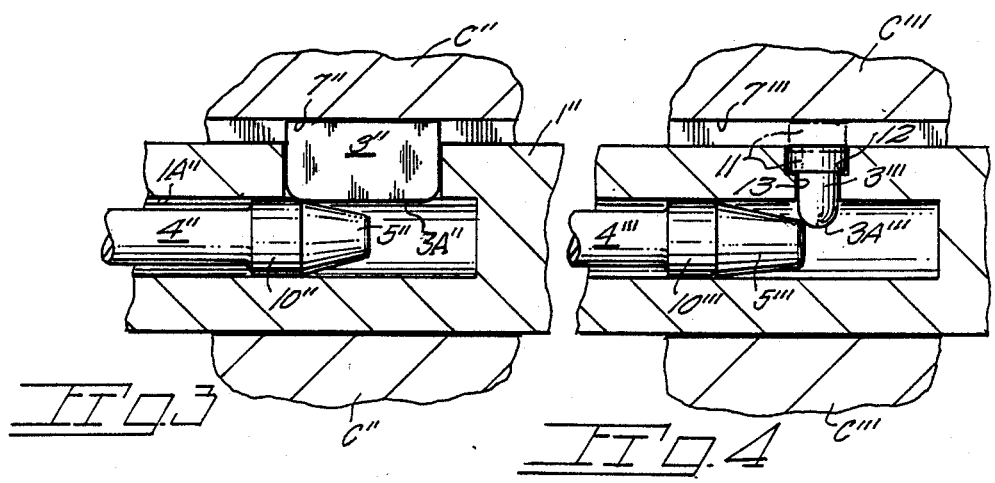
Fig. 3
Fig. 4

SHAFT MOUNTED LOCKING MEANS

BACKGROUND OF THE INVENTION

The present invention pertains generally to means for securing the hub of a gear, pulley, etc., to a shaft.

Typically shaft mounted items are fixed in place in the well-known manner by means of keys and/or set screws, locking hub assemblies and splines. An important consideration in affixing shaft carried items is the avoidance of damage to the shaft which would ultimately require disassembly effort and machining of the shaft or, in some instances shaft replacement, in either event a costly effort. A second consideration is the ease with which the shaft mounted component may be precisely positioned along the shaft as key installation can result in undesired shifting of the component on the shaft. A still further consideration is the original machining effort required both of the shaft and the component to be affixed thereto or the cost of a locking hub assembly.

Known arrangements for securing shaft carried items in place do not avoid the foregoing problems. Known locking hub assemblies for gears, sprockets, sheaves, etc., all contribute to an increase in the inside diameter requirement for the shaft mounted item. A further drawback to known locking hubs is the fact that they extend axially beyond the time being secured which is unacceptable where existing shaft length is critical.

Known key arrangements result in eventual migration or galling of metal parts with the resultant play or lost motion between shaft and shaft carried component greatly increasing wear, necessitating shaft, key and component replacement or refurbishment.

SUMMARY OF THE PRESENT INVENTION

The present invention is embodied in locking means utilizing an axially positionable lock within a shaft which drives key means into engagement with the item being secured to the shaft.

Cooperating surfaces on the lock and key means result in the latter being driven into forceful contact with the shaft carried component. The aforementioned surfaces function in cam fashion to afford extremely secure and precise locking of shaft components. Key means movement is primarily outward rather than axial which tends to avoid axial displacement of the item being locked to the shaft.

Important objectives of the present locking means include the provision of a lock housed within a shaft which displaces key means into abutment with the hub of a shaft carried article and which avoids modification or a size change of the article hub; the provision of locking means which permits effortless removal of a shaft carried article without damage to the shaft or the article; the provision of locking means that permits precise setting of an article on a shaft without risk of displacement as may occur during locking with conventional key means; the provision of shaft mounted locking means of low cost manufacture yet of high reliability.

BRIEF DESCRIPTION OF THE DRAWINGS

In the accompanying drawings:

FIG. 1 is a fragmentary view of a shaft end segment with parts broken away to disclose the present locking means in locking engagement with a shaft mounted article;

FIG. 2 is a view similar to FIG. 1 but showing modified locking means also embodying the present invention;

FIG. 3 is a view similar to FIG. 2 but showing a further modified form of the invention; and FIG. 4 shows a still further modification of the invention.

DETAILED DESCRIPTION OF THE PREFERRED EMBODIMENTS

With continuing attention to the drawings wherein applied reference numerals indicate parts similarly hereinafter identified, the reference numeral 1 indicates a shaft end segment to which a component C is to be removably secured.

The shaft is machined at 2 to define an opening to receive a key 3. Preferably a Woodruff key is utilized, but with an understanding of the invention, it will be understood that other key shapes may be suitable. An advantage with the Woodruff key is that the key is held against axial displacement during subsequent installation of the article held in place by the key.

The article or component C being secured to the shaft which, in one instance normally secured by a key, key and set screw combination or a locking hub including pulleys, sprockets and sheaves to mention a few.

A key lock at 4 is lengthwise disposed in a shaft bore 1A, An inner end 5 of the lock engages an inner surface 3A of the key to urge the key upwardly to locate a key outer edge 3B in abutment with a keyway surface 7 of a keyway or hub recess 6.

A threaded segment 7 of the lock is received within a threaded segment 8 of the shaft bore. For applying torque to the retainer, a wrenching tool receiving recess is at 9.

The key lock inner end 5 has a head portion 10 which substantially occupies the diameter of bore 1A permitting support of the head portion by the shaft.

Removal or axial adjustment of a keyed article from shaft 1 entails the backing off of the lock to permit the key to move slightly inward to disengage keyway 6 whereafter article C is free to slide along the shaft end segment. With the present locking arrangement, it is not necessary to drive the article or key using impact blows during installation or removal which could damage the shaft or the attached article.

To minimize galling of the key and lock 4, it has been found desirable to utilize a key with a curved inner edge such as the semicircular edge of a Woodruff key. Further, the inner end or the key retainer is preferably inclined to the axis A of the key retainer.

It will be understood that other key and lock configurations may be utilized within the scope of the present invention. In FIG. 2, prime reference numerals indicate like parts earlier identified with base reference numerals and wherein lock and key configuration is somewhat different than that first described. A pulley hub is at C'. A key edge at 3A' is inclined to a lock axis at A'. To reduce wear, the lock and the inner edge 3A of key may be case hardened. Wear is also reduced by providing key and retainer surfaces inclined to the shaft axis.

In FIG. 3 a straight key at 3' is urged into a keyway 6" of a shaft carried component c". The key has radiused corners terminating downwardly in a key inner edge 3A".

In FIG. 4 a key at 3" is of pin configuration having an enlarged end at 11 which rests on a counterbore shoulder 12 of a bore 13. A lock 4''' with an inner end 5''' urges the inner end surface 3''' of the key outwardly for key head abutment, per the broken line position, with a surface 7''' of the component C''' being secured to a shaft at 1'''.

While I have shown but a few embodiments of the invention, it will be apparent to those skilled in the art that the invention may be embodied still otherwise without departing from the spirit and scope of the invention.

Having thus described the invention, what is desired to be secured by a Letters Patent is:

I claim:

1. Locking means for securing a shaft carried article in place, said locking means comprising,
   a shaft segment having a radial key opening in communication with a shaft bore therein said shaft segment having a single key located
   in said opening and having an inner surface disposed in said bore and an outer edge located outwardly of said shaft, and
   an integral elongated lock axially positionable in said bore including a head portion of a size to occupy a segment of the shaft bore, a lock end engageable with the inner surface of said key to urge same outward of the shaft segment and into engagement with the shaft carried article, said head portion having a diameter substantially equal to the shaft bore diameter so as to be supported by the shaft segment against undue lateral displacement during locking engagement with the key.

2. The locking means claimed in claim 1 wherein said inner edge of the key is curvilinear.

3. The locking means claimed in claim 1 wherein said lock includes a threaded segment.

4. The locking means claimed in claim 1 wherein said lock and said key means include cooperating surfaces inclined to the shaft axis.

5. The locking means claimed in claim 4 wherein said key means is a Woodruff key.

6. The locking means claimed in claim 1 wherein said key means is of pin configuration.

7. The locking means claimed in claim 6 wherein said key means includes and enlarged end.

* * * * *